United States Patent [19]

Das Chaklader et al.

[11] Patent Number: 5,096,858

[45] Date of Patent: * Mar. 17, 1992

[54] IN SITU PRODUCTION OF SILICON CARBIDE REINFORCED CERAMIC COMPOSITES

[75] Inventors: Asoke C. Das Chaklader, Vancouver; Sankar Das Gupta, Toronto, both of Canada

[73] Assignee: The University of British Columbia, Vancouver, Canada

[*] Notice: The portion of the term of this patent subsequent to Apr. 30, 2008 has been disclaimed.

[21] Appl. No.: 668,112

[22] Filed: Mar. 12, 1991

Related U.S. Application Data

[63] Continuation of Ser. No. 582,388, Sep. 14, 1990, Pat. No. 5,011,799, which is a continuation-in-part of Ser. No. 409,054, Sep. 19, 1989, abandoned.

[51] Int. Cl.⁵ .................... C04B 35/10; C04B 35/14; C04B 35/56
[52] U.S. Cl. ..................... 501/89; 501/100; 501/128; 501/129; 501/130; 501/131
[58] Field of Search ................ 501/89, 100, 128, 129, 501/130, 131

[56] References Cited

U.S. PATENT DOCUMENTS

| | | | |
|---|---|---|---|
| 4,657,877 | 4/1987 | Becher | 501/89 |
| 5,011,799 | 4/1991 | Das Chaklader et al. | 501/89 |

FOREIGN PATENT DOCUMENTS

| | | | |
|---|---|---|---|
| 0743149 | 9/1966 | Canada | 501/128 |
| 309128 | 3/1989 | European Pat. Off. | |
| 2139568 | 2/1972 | Fed. Rep. of Germany | 501/128 |
| 42-013003 | 7/1967 | Japan | 501/128 |
| 52-076313 | 6/1977 | Japan | 501/128 |

OTHER PUBLICATIONS

Reaction of Clay & Carbon to Form & Separate $Al_2O_3$ and SiC, Bechtold & Cutler-Journal American Economic Society, May, Jun. 1980, pp. 271–275.

Alumina-SiC Composites from Kaolinite-Carbon Precursors by Hot Pressing, Penugonda and Chaklader, Solid State Phenomena, vol. 8 & 9 (1989), pp. 457-470.

*Primary Examiner*—William R. Dixon, Jr.
*Assistant Examiner*—Anthony J. Green
*Attorney, Agent, or Firm*—C. A. Rowley

[57] ABSTRACT

A method of producing ceramic composites of $Al_2O_3$ reinforced by shaped SiC particles preferably shaped as fine particles (random), platelets, whiskers or fibres by in situ production of SiC particles by heating a mixture of carbon particles of the desired shape with silicates of $Al_2O_3$ to a temperature above 1500° C., convert the silicates and carbon to $Al_2O_3$ and SiC to produce in situ SiC particles of the desired shape and provide a ceramic powder that may be densified by techniques such as hot pressing, isostatic pressing or sintering.

18 Claims, No Drawings

IN SITU PRODUCTION OF SILICON CARBIDE REINFORCED CERAMIC COMPOSITES

This application is a continuation of application Ser. No. 07/582,388, filed Sept. 14, 1990, now U.S. Pat. No. 5,011,799, which is a continuation-in-part of U.S. patent application Ser. No. 07/409,054 filed Sept. 19, 1989 now abandoned.

FIELD OF THE INVENTION

The present invention relates to a method for making ceramic composites reinforced by silicon carbide whiskers, fibres and particulates, which are produced in situ in the method of making the composite.

BACKGROUND OF THE INVENTION

Ceramic composites are gaining emphasis in diverse applications such as heat engine components, cutting tools and various wear resistant parts. The ceramic composites have typically improved fracture toughness and improved wear properties. Conventional ceramics are generally monolithic materials and have low fracture toughness. This makes these materials brittle and they are liable to crack under stressed conditions, and are not very useful for diverse demanding industrial applications. Monolithic ceramic materials such as silicon carbide, alumina, silicon nitride and mullite have low fracture toughness of between 2.5 to 4.5 ($K_{IC}$-MPa$\sqrt{m}$).

There has been extensive research underway to produce ceramic composites of higher fracture toughness, using matrix such as alumina, silicon nitride and silicon carbide, reinforced by materials such as silicon carbide particles which may be formed, for example, as whiskers or fibres.

Alumina as a matrix material with silicon carbide whisker reinforcement for ceramic composites have received strong attention. Fracture toughness and strength of alumina-SiC whisker composites ($Al_2O_3$-SiC) are much higher than monolithic alumina. The improved strength and fracture toughness are retained to high temperatures of around 1200° C. The reports on SiC whisker reinforced alumina matrix composites are so encouraging that the product is already being commercially produced as cutting tools, wear dies and other applications. Cutting tool materials typically contains around 30% SiC whiskers and show much better resistance to wear and fracture in machining operations. It has even been reported by E. R. Biollman, P. K. Mehrotra et al. Am.Cer.Soc.Bull., 1988, 67, 1016, that the estimated savings in field tests of machining a superalloy is 73% with the $Al_2O_3$-SiC composite tools as compared to machining with just $Al_2O_3$ tools.

Typically these composites (G. C. Wei, U.S. Pat. No. 4,543,345) are produced by mechanically mixing single crystal SiC whiskers with fine ceramic powders such as alumina ($Al_2O_3$) such that the SiC whiskers are uniformly and homogeneously dispersed. This homogeneous dispersion is normally difficult to achieve through mechanical mixing processes. The mixture is then densified through techniques such as hot pressing at pressures in the range of 28 to 70 MPa and temperatures in the range of about 1600° to 1950° C. with pressing times varying about 0.75 to 2.5 hours.

There are a number of major problems with the above ceramic composite and process for making same. The silicon carbide whiskers are very expensive as they are made primarily through a VLS process. The silicon carbide whiskers are extremely carcinogenic and are very dangerous to handle. The dispersion of the SiC whiskers is difficult to achieve and elaborate processing techniques are necessary. With mechanical methods of mixing whiskers and ceramic matrix powders, there is the possibility of whiskers clustering together and whisker damage, and the extent of whisker loading is limited. For example in order to obtain a good dispersibility of whiskers and thus improve the strength of the composite, both ultrasonic dispersion techniques and finer particle, non-agglomerated matrix powder have to be used (P. F. Becher and G. C. Wei, Journal of the American Ceramic Society., 1084, 67,C267). Very elaborate processing techniques, involving flotation or sedimentation from dispersions of the components, were found to be effective in eliminating the potential flaw types (J. Homery, W. L. Vaughn and M. K. Ferber in the American Ceramic Society Bulletin, 1987, 67,333). With the new information that the SiC whiskers are very carcinogenic, all these complex processing techniques have become very unpleasant.

SUMMARY OF THE INVENTION

Accordingly, it is a primary aim or objective of the present invention to provide a process for making ceramic composite powders strengthened with silicon carbide particles wherein the SiC phase is produced in situ in the ceramic powder matrix.

Broadly the present invention relates to a process for making the alumina-SiC composites ceramic powder comprising forming a mixture of alumino-silicates and carbon particles as precursor material, reacting said mixture of at a temperature of above 1500° C. to transform said mixture into a ceramic powder of $Al_2O_3$ and silicon carbide as major phases.

Preferably said temperature will be above 1600° C.

Preferably said carbon particles will be in shapes selected from the group of platelets, whiskers and fibres.

Preferably the mixture will further include silicates of zirconium and the resultant ceramic powder formed after reacting will further include $ZrO_2$.

The mixture may further comprise carbon elements more reactive than said carbon particles.

Preferably said alumino-silicate will be a clay, raw or calcined, mullite, kyanite, sillimanite, pyrophyllite or combinations thereof.

More preferably said alumino-silicate will be synthetic alumino-silicate.

Preferably the ceramic powder will then be densified for example by hot pressing, hot isostatic pressing or sintering to produce a consolidated composite product.

DETAILED DESCRIPTION OF THE INVENTION

Example of starting materials for the present invention for providing the alumino-silicates may be pure kaolinitic clays, raw or calcined, mullite, kyanite, sillimanite, pyrophyllite, etc. Other clays may also be used but because of impurities in the clays, the final product would naturally contain other phases. Instead of clays, synthetic alumino-silicates (i.e. alumino-silicates formed by freeze drying, co-precipitation, etc.) may also be used. What is necessary is that the starting material should be a source of final alumina —$Al_2O_3$.

The starting material must also provide a source of silica which normally will come from the alumino-silicates (and zirconium silicates) but may also be provided through added silica.

Another basic material is carbon in the form of carbon particles which is necessary for reduction of the silica and to form the silicon carbide (SiC) reinforcing phase. The carbon particles may be in any desired shape, for example, in the form of hexagonal flakes, (random) particulates or fibres. The size and shape of the carbon particles determines the final size and shape of the silicon carbide material in the resultant ceramic powder or composite.

1. The simplest stoichiometric mixture to produce the composite is:

$$Al_2O_3 2SiO_2 2H_2O + 6C \rightarrow Al_2O_3 + 2SiC + 4CO + 2H_2O (Kaolin) \quad (1)$$

This mixture would produce a composite having the two major phases alumina and silicon carbide in the proportion of $Al_2O_3$ (~56 wt %) and SiC (~44 wt %) (assumed no SiO loss from the system).

2. If it is desired that the concentration of SiC phase be changed, i.e. increased or decreased then a mixture of clay, alumina (or a source of alumina), silica (or a source of silica) and carbon, may be adjusted, for example, as follows:

(i) To decrease the concentration of SiC in the stoichiometric mixture as in #1

$$Al_2O_3 2SiO_2 2H_2O + Al_2O_{3(x)} + 6C \rightarrow Al_2O_{3(1-x)} + 2SiC + 4CO + 2H_2O \quad (2)$$

where $x = 0$ to 6.

(ii) To increase the concentration of SiC in the stoichiometric mixture as in #1

$$Al_2O_3 2SiO_2 2H_2O + SiO_{2(y)} + (6 + 3y)C \rightarrow Al_2O_3 + (2+y)SiC + (4+2y)CO + 2H_2O \quad (3)$$

where $y = 0$ to 6.

3. It is also possible to carry out the present invention starting with synthetic alumino-silicate or a mechanical mixture of alumina, silica and carbon powders. The proportion of alumina, silica and carbon will vary depending upon the extent of the SiC phase desired in the composites. The stoichiometric reaction for the formation of these composites is as follows:

$$(Al_2O_3)_m + (SiO_2)_n + C_p \rightarrow mAl_2O_3 + nSiC + 2nCO$$

where $p = 3n$; $n = 1$ to 7; $m = 1$ to 4; and $m/n = 1$ to 7.

4. To improve on the fracture toughness of the $Al_2O_3$-SiC composites, it may be desirable to add $ZrO_2$ into the system. Zirconium silicate ($ZrSiO_4$) will provide $ZrO_2$ after dissociation and $SiO_2$ will combine with the carbon and be converted to SiC. Thus SiC can be produced from both alumino-silicates and zircon powders. The reactions leading to the formation of $Al_2O_3$, $ZrO_2$ and SiC can be represented as follows:

$$Al_2O_3 \cdot 2SiO_2 \cdot 2H_2O + ZrSiO_4 + 9C \rightarrow Al_2O_3 + 3SiC + ZrO_2 + 6CO + H_2O \quad (5)$$

The amount of the zirconia phase in the composite can be easily varied by adding different amounts of zircon. The $ZrO_2$ formed by the decomposition of the zircon is very finely divided and helps in improving the toughness. Generally $ZrO_2$ will be present in the composite in the range of 5 to 20 weight percent $ZrO_2$, which requires the zirconium silicate to be present in the raw materials in the amount of about 7.5 to about 30% by weight of the raw material mixture of clay, carbon and $ZrSiO_4$.

Similarly the composite may include TiC in the range of about 5 to 30% by weight in the powder by adding $TiO_2$ to the raw material mix of clay, carbon and $TiO_2$.

It is believed that $TaO_5$, $CrO_3$, $WO_3$ or $MoO_3$ could also be incorporated in useful proportions in place of the $TiO_2$ or $ZrO_2$ to form a composite powder containing $Al_2O_3$ and SiC and forming in situ other (corresponding) carbide phases.

5. The carbon in mixtures described above in #1 to #4 may be any form of pure carbon which will reduce the $SiO_2$ in clay or in synthetic alumino-silicate or in added $SiO_2$ or in the $ZrSiO_4$ and convert them into SiC. The SiC particles produced in mixtures #1 to #4 are random in shape. But if it is desired that the silicon carbide particles (all or some) in the composites should have certain morphology such as fibres, rods or hexagonal platelets, then the carbon in mixtures #1 to #4 can be partly (or all) replaced by carbon in appropriate shaped elements, e.g. in the form of hexagonal platelets or graphite (or carbon) fibres.

It should be noted that the function of carbon is twofold in the formation of silicon carbide from $SiO_2$. First, carbon reduces $SiO_2$ into SiO which is a vapour species. This SiO then migrates to other carbon particles to form SiC and CO.

Thus in the process of formation of $Al_2O_3$ and SiC from $Al_2O_3 2SiO_2 2H_2O$ (clay), a weight loss of ~40% is encountered. It is desirable then to add two types of carbon to the mixtures, (i) highly reactive to facilitate the first stage of the reduction reaction and, (ii) stable carbon, such as graphite flakes or fibres for the formation of morphologically controlled SiC particles.

It is important to note that there would always be some loss of Si from the system as SiO, along with CO. Depending upon the closeness of the reaction vessel (this cannot be completely closed as removal of CO must take place in order that reactions (1) to (5) may proceed) a weight loss (because of loss of SiO) between 3 to 5 wt % or more has been encountered. During formulation of the raw materials mix batches, this loss of silicon as SiO should be taken into consideration.

PROCESSING STEPS

Appropriate proportions of materials (silicates and carbon) can be mixed dry or wet, however if wet mixing is used the mixture formed should be filtered and dried. For stoichiometric mixture of raw clays and carbon (reaction #1), the amounts would be about 78.2 wt % of raw kaolinite and 21.8 wt % of carbon and for calcined clays, this will be about 75.5 wt % of calcined Kaolinite and about 24.5 wt % of carbon.

For a composite containing also zirconia as a toughening agent, a mixture of raw kaolin, zircon (very finely ground) and carbon will produce a mixture of $Al_2O_3$, $ZrO_2$ and SiC in the system. For example, if it is desired to produce a composition containing 15 wt % $ZrO_2$, a mixture of 66 gms of kaolin, 13 gms of zircon and 21 gms of carbon should give nominally 45 wt % $Al_2O_3$, 15 wt % $ZrO_2$ and 40 wt % SiC, assuming no SiO is lost from the system.

If it is desired that the level of SiC in the composite should be low, for example at levels of between 10 to 25 wt %, then it will be necessary to adjust the initial formulations such that some $Al_2O_3$ or $ZrO_2$ as a finely divided powder is added to the starting material such that the final composition will be as desired.

When very high levels of finely divided SiC are present in the ceramic powder, it is difficult to densify the powder without using techniques such as hot pressing.

The thoroughly mixed powder formed as above described is then calcined in an inert atmosphere (preferably Ar or He) at a temperature greater than 1500° C. and more conveniently above 1600° C. for the reaction to complete more quickly. This firing step is crucial for the reactions (1) to (5) to take place and almost go to completion forming a final mixture of $Al_2O_3$ (and $ZrO_2$) and SiC as the major phases. Obviously the temperature must not be so high that the desired end products are decomposed or other undesireable phases are formed.

Depending on the impurities present in the starting materials, e.g. clays and the time and temperature of firing, the minor phases may include TiC, mullite and carbon. It has also been possible to take reaction (1) to completion, i.e. the only major phases present would be $\alpha$-$Al_2O_3$ and $\beta$-SiC with no mullite phase when the mixtures were fired at 1700° C. for several hours (for a batch of 10 gms or more).

If the powder is pelletized before firing, the reactions leading to the formation of $Al_2O_3$ and SiC take shorter times. Pelletization also reduces SiO loss during these reactions.

The reaction sequence in the formation of $\alpha$-$Al_2O_3$ and $\beta$-SiC from clay and carbon may be as follows:

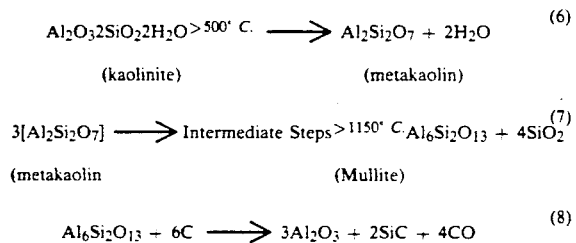

Depending upon the $Al_2O_3$ to $SiO_2$ ratio, an equation equivalent to (8) would apply for a synthetic aluminosilicate and carbon mixture.

The morphology of the silicon carbide particles after calcination can be controlled by using morphologically controlled carbon particles. For example, addition of ~10 wt % of carbon fibres (or graphite flakes), the remaining carbon in the mixture being amorphous lamp black, resulted in the formation of silicon carbide particles in the form of both fibres and random shaped particles. The SiC fibres are formed from the carbon fibres added in the mixture and random shaped particles originated from the conversion of lamp black carbon into silicon carbide particles.

It is also important to note that natural clay materials have impurities such as CaO, MgO, $Na_2O$, $K_2O$, $TiO_2$, $Fe_2O_3$ etc. and it is thought that these impurities would affect the final properties of the composites. However, it has been found that the heat treatment that is necessary for the formation of $Al_2O_3$ and SiC from clay minerals, also removes $Na_2O$, $K_2O$ and MgO by vaporization because of the presence of strong reducing atmosphere during reactions (1) to (4). Thus, the reactions which produce the major phases $Al_2O_3$ and SiC, also eliminates some of the harmful oxides present in raw clay materials. Chemical analysis carried out on the alumina-silicon carbide composites produced from mixtures of kaolinitic clay and carbon showed that almost all of alkalies and MgO disappeared from the system by vaporization.

After reacting to form the ceramic powder, this powder may be consolidated as desired, for example, to almost full density either by hot-pressing or hot-isostatic pressing. Prior to this final step of consolidation however, complex shapes by slip casting, injection molding, etc., can be pre-fabricated before hipping. For simple shapes, such as cylindrical specimens (billets and disks) these can be directly hot-pressed in a graphite die. From these disks, small specimens, e.g. cutting tools can be prepared by sawing or other techniques.

Because of the presence of the silicon carbide, it has been found to be difficult to sinter these powders (i.e. without pressure) to high density (>0.90 of the theoretical). Hot-pressing these powders above 1800° C. under 20 MPa (or greater) resulted in products having >95% of theoretical density. Because of the higher pressures that can be applied during the hipping the final consolidation step can be done at a lower temperature.

The properties of the composite products thus produced with different combinations of precursor materials, such as clay, alumina, silica and carbon have been found to be acceptable for several commercial applications. For example, hot-pressed products having >98% theoretical density have been produced with hardness greater than 2000 $Kg/mm^2$ on Vicker's hardness scale and fracture toughness ($K_{IC}$) in the range 2.5 to ~7.0 MPa$\sqrt{m}$, depending upon the final density achieved, composition and processing conditions used.

The following examples are given for the purpose of illustrating the present invention without being intended to limit its scope.

EXAMPLE 1

A batch of raw Georgia kaolin (AJAX grade) clay was mixed with carbon (Lamp black) in stoichiometric proportion, i.e. 78 gms of raw (uncalcined) clay and 22 gms of carbon was dry-mixed in a vibratory ball mill (with alumina balls). From this thoroughly mixed powder, small cylindrical pellets (1 cm dia., 1 cm thick) and large cylindrical pellets (2.54 cm dia. and 1 cm thick) were cold-pressed. Loose powder, small and large pellets, was subjected to different heat treatments. It has been observed that small pellets took lower temperature (e.g. 1600° C.) and shorter time (0.5 hr), compared to larger pellets, for complete conversion to alumina and silicon carbide. Larger pellets required 1700° C. for 1.5 hours. SiO loss from the loose powder was also more noticeable. The phases were identified by x-ray diffraction analysis. SEM and EDX studies showed random-shaped particles and homogenous mixtures of the two phases.

This mixture then was hot-pressed first at 1700° C. and then at 1900° C. for 10 minutes. The bulk density of the hot-pressed specimen was 3.60 $gm/cm^3$. (Note: The bulk density or theoretical density of a fully dense pellet of 56 wt % $Al_2O_3$ and 44 wt % SiC is 3.66 $gm/cm^3$). The Vicker's hardness of the specimens varied between 1950 and 2400 $kg/mm^2$. The mean hardness being ~2300 $kg/mm^2$. The fracture toughness ($K_{IC}$) value varied between 3.75 and 6.20 MPa$\sqrt{m}$, the mean $K_{IC}$ value of ~5.7 MPa$\sqrt{m}$.

EXAMPLE 2

A batch of calcined Georgia kaolin (calcined at 750° C.) was mixed with (lamp black) carbon in stoichiometric proportions, i.e. 75.5 gms of calcined clay and 24.5 gms of carbon, was thoroughly dry-mixed in a ball mill. This mixture was then cold-pressed into large pellets (2.5 cm dia) and fired at 1650° C. for 30 minutes. An x-ray diffraction analysis showed that 20–25% mullite was present in this system. The specimens were refired at 1700° C. for 1 hour in argon, which had no detectable mullite phase.

The fired mixture was hot-pressed at 1900° C. under 3000 psi to make pellets. The bulk density varied in the range of 3.55–3.587 g/cm$^3$. The Vicker's hardness value of these materials ranged from 2000 to 2150 Kg/mm$^2$ and the average fracture toughness value was ~4.5 MPa$\sqrt{m}$.

EXAMPLE 3

A batch of mixtures of 65 gms of raw kaolinitic clay (uncalcined), 12.3 gms of carbon (lamp black) and 6.1 gms of high strength chopped graphite fibres (1 to 5 μm dia. and 0.3–0.5 cm long) were wet mixed in isopropyl alcohol. The mix was filtered, dried and pelletized. This mixture was then calcined in argon at 1700° C. for 1.5 hours. X-ray analysis showed only $Al_2O_3$ and SiC phases. SEM analysis showed presence of SiC fibres distributed throughout the mass. This calcined powder was then wet ball milled in alcohol and pelletized (cylindrical discs). These discs were hot pressed at 1900° C. for 15 mins. The resulting products had a density varying from 3.45 to 3.60 gms/cm$^3$. The final composites had a Vicker's hardness of greater than 2000 Kg/mm$^2$ and fracture toughness ($K_{IC}$) in the range 3.0 to 8.0 MPa$\sqrt{m}$.

EXAMPLE 4

A mixture of raw (uncalcined) kaolin clay (99 gms), natural zirconium silicate (Zircon-19.5 g) and carbon (31.5 g) was prepared by wet milling. The batch was filtered, dried and dry-mixed (again). This powder was used to make discs which were calcined at 1750° C. for 2 hours. X-ray analysis showed that they were composed of $Al_2O_3$, $ZrO_2$ and SiC. This powder mixture was hot-pressed at 1900° C. for 20 mins. The final pellets have Vicker's hardness >2000 Kg/mm$^2$ and fracture toughness $K_{IC}$ in the range 5 to >8 MPa$\sqrt{m}$.

EXAMPLE 5

A synthetic mixture of $Al_2O_3$ and $SiO_2$, having the equivalent composition of mullite ($3Al_2O_3 \cdot 2SiO_2$) was produced from a freeze-dried mixture of $Al_2(SO_4)_3 \cdot XH_2O$ and silica gel. This freeze-dried powder has a weight loss of ca. 75% on calcining. The powder was only partially calcined and then carbon powder was added to it. The weight ratio of calcined alumina-silica phase to carbon is 36 to 6, i.e. 36 gms of calcined aluminosilicate powder to 6.0 gms of carbon. This mixture is then heated to 1650° C. for 2 hours, producing $Al_2O_3$ and SiC in situ. This calcined powder was then hot-pressed at 1850° C. for 2 hours to form discs. The final discs have Vicker's hardness greater than 2000 Kg/mm$^2$ and fracture toughness ($K_{IC}$) in the range 3 to 6.5 MPa$\sqrt{m}$.

EXAMPLE 6

A mixture of raw (uncalcined) pyrophyllite (78 grams) and carbon (lamp black—31.2 grams) was prepared by dry mixing a ball mill. Cylindrical pellets of two inches in diameter were produced by cold pressing. These pellets were fired at 1650°–1700° C. for one hour in argon. The fired pellets were soft and could be easily crushed. X-ray analyses showed that the final mixture was composed of SiC and $Al_2O_3$ with traces of mullite.

EXAMPLE 7

A mixture of raw (uncalcined) kyanite (78 grams) and carbon (lamp black—17.4 grams) was prepared by dry mixing in a ball mill. Cylindrical pellets of two inches in diameter were produced by cold pressing. These pellets were fired at 1650°–1700° C. for one hour in argon. The fired pellets were soft and could be easily crushed. X-ray analyses showed that the final mixture was composed of SiC and $Al_2O_3$.

EXAMPLE 8

A mixture of raw clay (kaolinite—78 grams) with lamp black carbon (14.5 grams) was prepared by dry mixing. Pellets were cold pressed and then fired in argon at approx. 1550°–1600° C. for two hours. The final mixture was found to contain mullite and SiC as the major phases and $SiO_2$ as a minor component, as evidenced by x-ray diffraction analyses.

EXAMPLE 9

A mixture of raw clay (kaolinite—78 grams) with lamp black carbon (7.3 grams) was prepared by dry mixing. Pellets were cold pressed and then fired in argon at approx. 1550°–1600° C. for two hours. X-ray analyses showed the final mixture contained mullite, SiC and $SiO_2$ (cristobalite).

FURTHER EXPERIMENTS

The following Table 1 provides a list of different experiments carried out with different reactants and observations made.

TABLE 1

| No. | Reaction | Temp. (C.) | Temp Meas. Device | Reaction Time (Min.) | Comments |
|---|---|---|---|---|---|
| 1 | C + Clay | 1500 | Opt. Pyro. | 60 | Test run. |
| 2 | C + Clay + $TiO_2$ | 1500 | Opt. Pyro. | 60 | Incomplete Reaction |
| 3 | Refired | 1500 | Opt. Pyro. | 60 | Complete Reaction |
| 4 | C + Clay + $ZrSiO_4$ | 1650 | Opt. Pyro. | 75 | Middle portion of top pellet is unreacted. |
| 5 | C + Clay + $TiO_2$ | 1600 | Opt. Pyro. | 90 | Complete Reaction |
| 6 | C + Clay + $TiO_2$ | 1600 | Opt. Pyro. | 60 | Incomplete Reaction |
| 6(a) | Refired | 1600 | Opt. Pyro. | 60 | Complete Reaction |
| 7 | C + Clay + $ZrSiO_4$ | 1600 | Opt. Pyro. | 60 | Incomplete Reaction |
| 7(a) | Refired | 1600 | Opt. Pyro. | 35 | ZrC peak was evident. |
| 8 | C + Clay + $ZrSiO_4$ | 1600 | Opt. Pyro. | 80 | Complete Reaction. |
| 9 | C + Clay + $ZrSiO_4$ | 1600 | Opt. Pyro. | 95 | Complete Reaction. |

TABLE 1-continued

| No. | Reaction | Temp. (C.) | Temp Meas. Device | Reaction Time (Min.) | Comments |
|---|---|---|---|---|---|
| 10 | C + SiO$_2$ + ZrSiO$_4$ | 1600 | Opt. Pyro. | 60 | Incomplete Reaction. |
| 10(a) | Refired | 1600 | Opt. Pyro. | 60 | Incomplete Reaction. |
| 11 | C + Clay | 1350 | Pyro. + Thermo | 90 | Incomplete Reaction (SiC and mullite were evident but no Al$_2$O$_3$) |
| 12 | C + SiO$_2$ + ZrSiO$_4$ | 1650 | Pyro. + Thermo | 60 | Incomplete Reaction. |
| 13 | C + SiO$_2$ + ZrSiO$_4$ | 1700 | Pyro. + Thermo | 60 | Incomplete Reaction. (SiC, ZrO$_2$ and ZrSiO$_4$ were evident). |
| 13(a) | Refired | 1700 | Pyro. + Thermo | 35 | ZrO$_2$ and ZrC were evident. |
| 14 | C + SiO$_2$ + ZrSiO$_4$ | 1700 | Pyro. + Thermo | 80 | Top pellet: SiO$_2$, ZrO$_2$ Bottom pellet: ZrC + SiC |
| 15 | C + SiO$_2$ + ZrSiO$_4$ | 1680 | Pyro. + Thermo | 60 | ZrC & SiC were evident. |

Note the comment 'complete reaction' means there was substantially no silicate and no unreacted carbon left.

It has been found that operating for example with Zircon if the reaction is carried on for a long time or at a high temperature, ZrC is formed in addition to ZrO$_2$ formation. For example, at 1800° C. predominantly ZrC was formed whereas at 1600°-1700° C. for a short time (up to approximately 30 minutes) predominantly ZrO$_2$ was formed.

In a specimen produced using clay, carbon and TiO$_2$ and reacted to form Al$_2$O$_3$, SiC and TiC composite powder it was found under examination using a scanning electro microscope (SEM) that the SiC particles were spherical in shape and the TiC phase was evenly distributed in the alumina grains which were randomly formed.

Having described the invention, modifications will be evident to those skilled in the art without departing from the spirit of the invention as defined in the appended claims.

We claim:

1. A process for making alumina-SiC composite ceramic powder comprising forming a mixture of alumino-silicates and carbon particles as precursor material, reacting said mixture at a temperature of above 1500° C. to transform said mixture into said composite ceramic powder having Al$_2$O$_3$ and SiC as major phases while eliminating substantially all alkalies and MgO by vaporization.

2. A process as defined in claim 1 wherein said carbon particles are in shapes selected from the group of platelets and fibres.

3. A process as defined in claim 1 wherein said mixture further comprises carbon elements more reactive than said carbon particles.

4. A process as defined in claim 1 wherein said alumino-silicate is a synthetic alumino-silicate.

5. A process as defined in claim 1 wherein said alumino-silicate is selected from the group of clays, mullite, kyanite, sillimanite, pyrophyllite or mixtures thereof.

6. A process as defined in claim 1 wherein said alumino-silicate is a clay.

7. A process as defined in claim 1 wherein said temperature is selected in the range of 1600° to 1800° C.

8. A process as defined in claim 2 wherein said temperature is selected in the range of 1600° to 1800° C.

9. A process as defined in claim 3 wherein said temperature is selected in the range of 1600° to 1800° C.

10. A process as defined in claim 4 wherein said temperature is selected in the range of 1600° to 1800° C.

11. A process as defined in claim 5 wherein said temperature is selected in the range of 1600° to 1800° C.

12. A process as defined in claim 6 wherein said temperature is selected in the range of 1600° to 1800° C.

13. A process as defined in claim 1 wherein said mixture further comprises zirconium silicate and said powder includes zirconium oxide.

14. A process as defined in claim 2 wherein said mixture further comprises zirconium silicate and said powder includes zirconium oxide.

15. A process as defined in claim 3 wherein said mixture further comprises zirconium silicate and said powder includes zirconium oxide.

16. A process as defined in claim 4 wherein said mixture further comprises zirconium silicate and said powder includes zirconium oxide.

17. A process as defined in claim 5 wherein said mixture further comprises zirconium silicate and said powder includes zirconium oxide.

18. A process as defined in claim 6 wherein said mixture further comprises zirconium silicate and said powder includes zirconium oxide.

* * * * *